Figure 5:
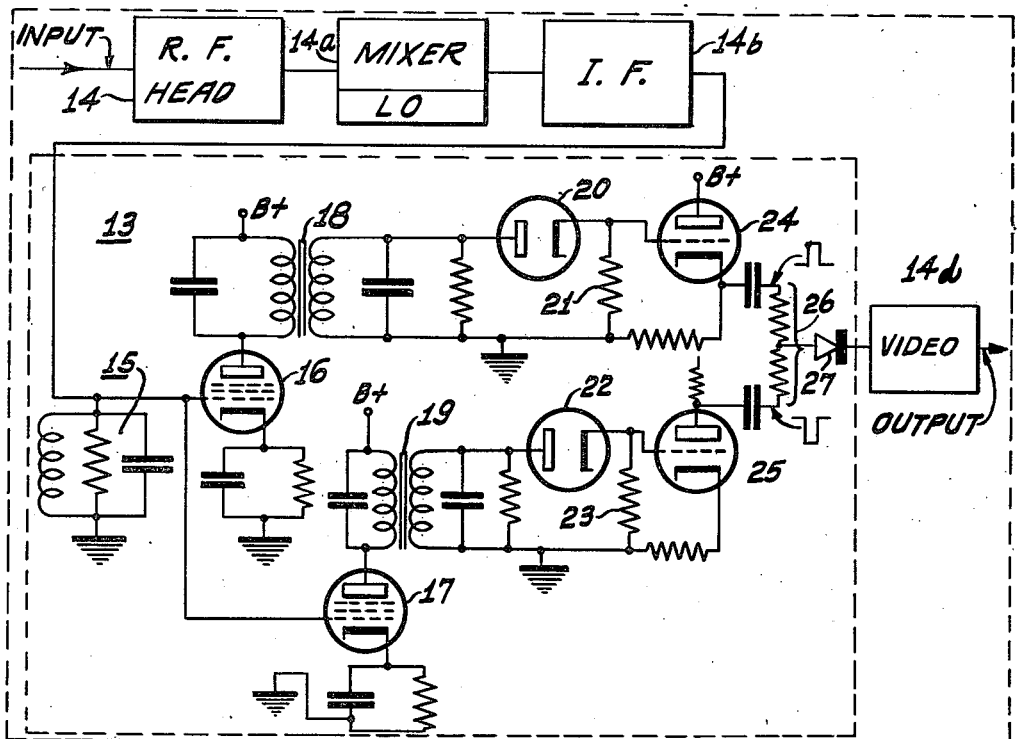

July 23, 1957 J. N. MARSHALL 2,800,651
RADIO BEACON
Filed Nov. 30, 1948 4 Sheets-Sheet 1
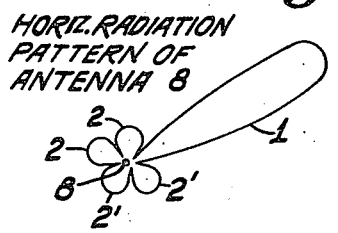
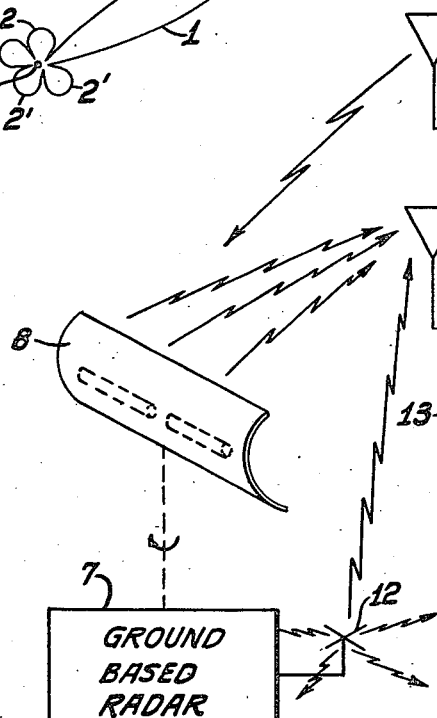
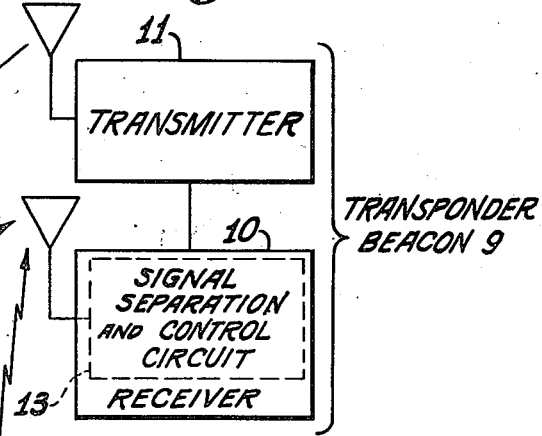
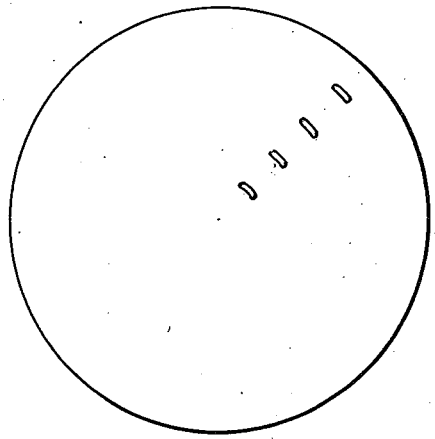
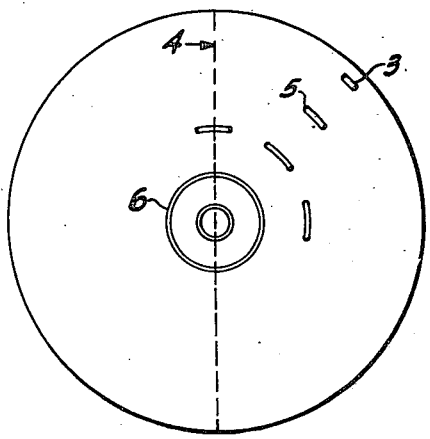
INVENTOR
John N. Marshall
BY
ATTORNEY INVENTOR
John N. Marshall
BY
ATTORNEY

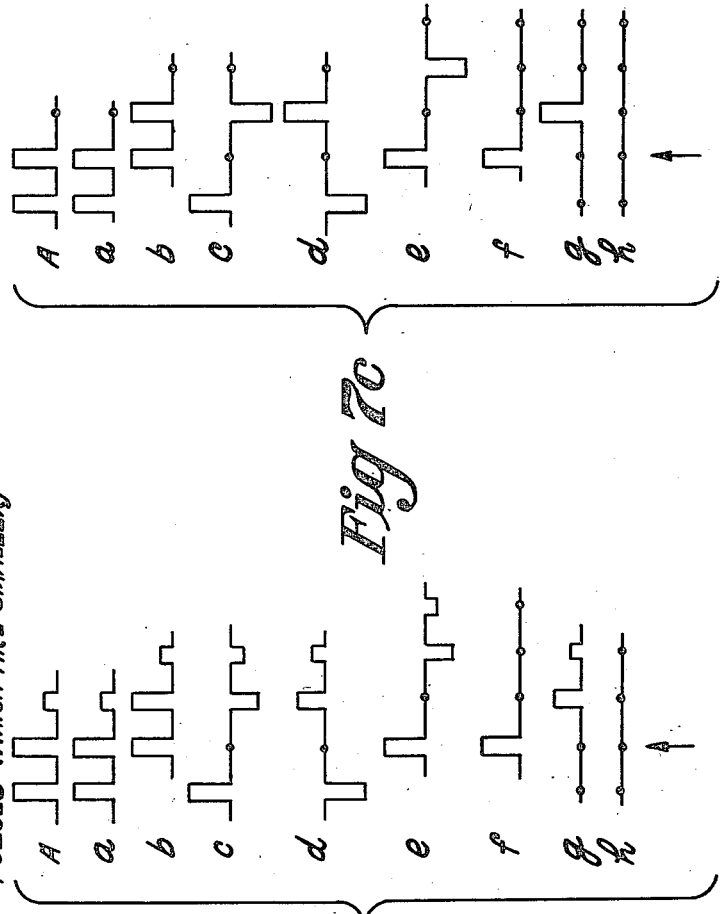

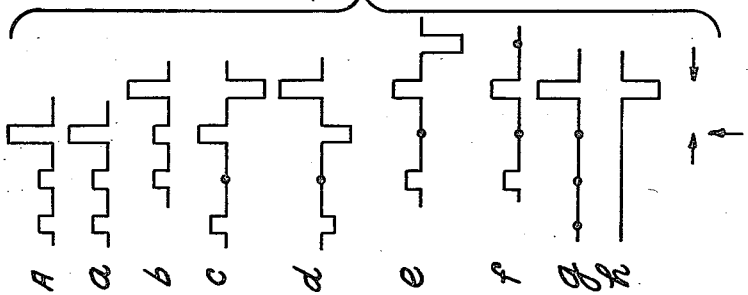
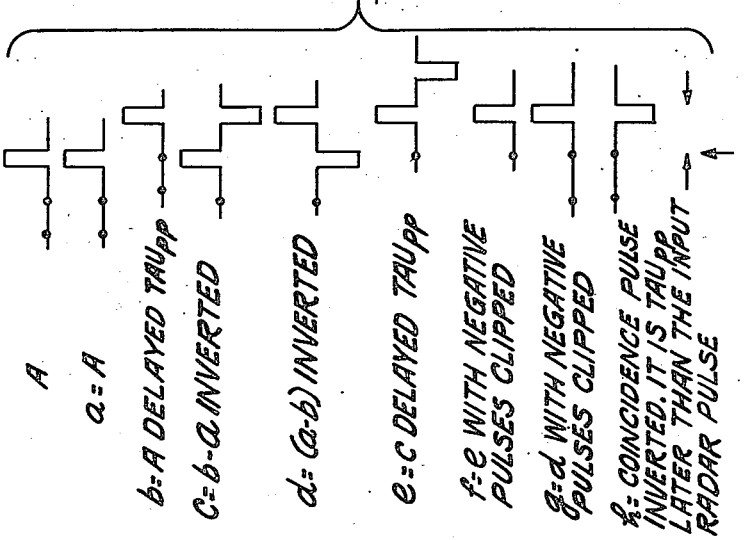

United States Patent Office 2,800,651
Patented July 23, 1957

2,800,651
RADIO BEACON

John Nathaniel Marshall, Philadelphia, Pa., assignor to Radio Corporation of America, a corporation of Delaware Application November 30, 1948, Serial No. 62,715

10 Claims. (Cl. 343—6.5)

This invention relates to improvements in control circuits and more particularly to control circuits for pulse radio receivers as used in radar transponder beacons. The term "transponder" as used herein is intended to mean a beacon including a receiver designed to receive signals which are referred to hereinafter as "interrogation" signals, and a transmitter controlled by the output of said receiver to transmit other signals which are called "reply" signals.

One use for transponder beacons is an aircraft which are to be located and identified by search radar apparatus. A beacon will provide a reply signal which is much stronger than the reflected radar signal; the reply signal may be on a different frequency from the radar signal, enabling the separation at the radar station of "ground clutter" or fixed echoes from the desired reply signals. Usually the reply signal is coded in some manner to indicate the identity of the aircraft and/or its approximate altitude.

A radar signal of at least a certain minimum strength is required at the beacon receiver in order to operate the beacon transmitter. As a corollary, the beacon ordinarily will be triggered by any radar signal which is stronger than said minimum. This would not be particularly objectionable if the radar antenna could transmit only in one direction at a time; however, the directive pattern of a typical radar antenna includes not only a relatively sharp main lobe (see 1, Figure 2), but also a number of secondary lobes (see 2, Figure 2), which extend throughout a wide angle in azimuth.

When the transponder is at a considerable distance from the radar station, for example 100 miles, the signal strength is sufficient to trigger it only when the main lobe is pointed toward the aircraft. Assuming that the radar is of the P. P. I. (plan position indicator) type the resulting indication will be a small spot or "pip" (see 3, Figure 4) at a radial distance from the center of the display corresponding to the distance of the aircraft from the radar station, and at an angle, with respect to some reference direction (4, Figure 4) corresponding to the bearing of the craft.

An aircraft which is somewhat closer to the ground station, for example, at a distance of 75 miles, will receive a signal of the requisite strength during a greater portion of the sweep of the radar beam, producing a wider pip (5, Figure 4) on the radar display. The bearing of the aircraft can still be found simply by determining the center of the extended pip. As the craft approaches the ground station a point will be reached where the signal strength in the side lobes is enough to operate the transmitter.

When this happens, additional pips appear in the radar display, corresponding to the larger side lobes in the antenna pattern. As the craft comes still closer to the radar, small side lobes produce pips, and finally sufficient energy is received to trigger the beacon at all azimuths, and produce a full circle on the display (6, Figure 4). There is no way of determining the bearing of an aircraft from a circular trace.

In the prior art, it has been known to prevent the above-described broadening of indications in the radar display by varying the minimum signal level required to operate the beacon according to the maximum strength of the radar signal being received at the beacon, i. e., by using an automatic gain control circuit which responds to the signals received during the time the main lobe of the radar beam travels past the aircraft, and maintains control of the receiver during the entire scanning period of the radar. An arrangement of this kind is described in copending application Serial No. 788,198, filed November 26, 1947, now Patent No. 2,594,916, dated April 29, 1952.

This arrangement has the disadvantage that the beacon will be unresponsive to more than one radar at a time except in rare cases where two or more radars deliver approximately equal main lobe signal strengths at the location of the beacon. Ordinarily, the radar transmitting the strongest main lobe signals to the beacon, e. g., the nearest radar, will set the automatic gain control to render the receiver unreceptive to other radars. This is very undesirable, since the indicators of those other radars will not present complete information.

Accordingly, it is an object of the present invention to provide a control circuit for a receiver of radar pulses, such as the receiver of a transponder beacon, which will effectively reject pulses received as side lobe radiations but will do so without preventing the receiver from receiving relatively weak main lobe signals from other radars.

It is a further object of the present invention to provide a circuit which affects the receiver only in the time channel of the radar's pulse transmissions or in one or more time channels synchronous therewith, causing it to reject side lobe pulses of that radar but leaving it unaffected during all other time channels.

It is a further object of the present invention to provide a circuit which is controllable by transmissions received from the radar in the time channel of its radar pulse transmissions, or in one or more time channels synchronous therewith, effectively to reject side lobe pulses of said radar without interfering with the receiver during other time channels, the circuits being so arranged that, in an absence of radar pulses at the receiver, the control transmissions will not themselves spuriously actuate it to produce output pulses simulating radar pulses.

It is a further object of the present invention to devise a control circuit as described above which is so arranged that, in an absence of control transmissions at the receiver, the circuit will not prevent the receiver from receiving radar pulses.

Figure 6:
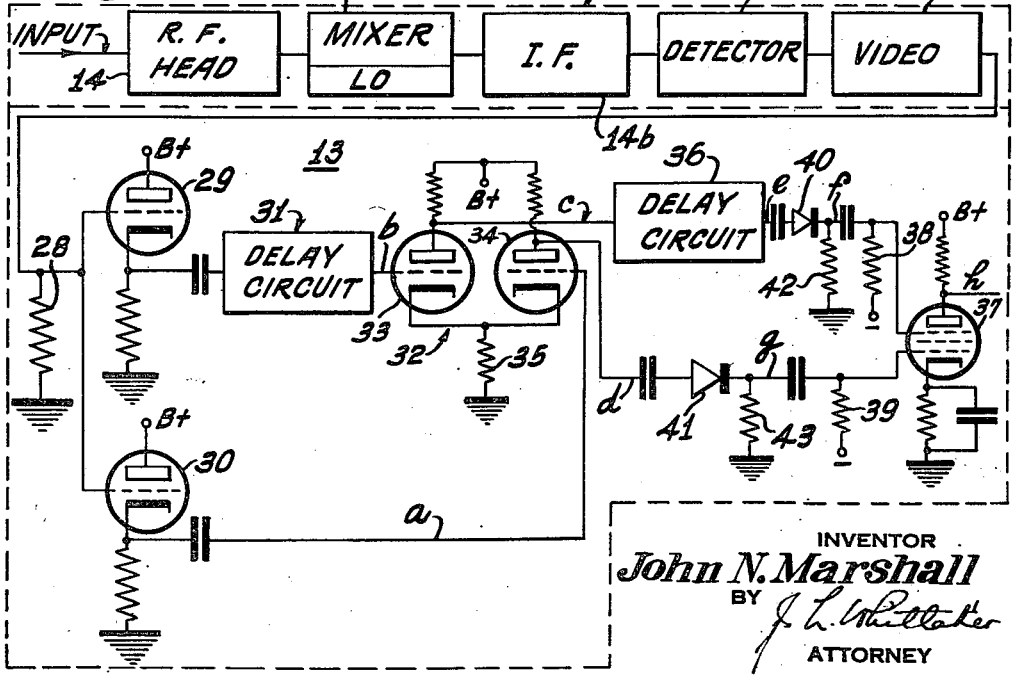

The invention will be described with reference to the accompanying drawing, wherein:

Figure 1 is a schematic diagram of a radar and transponder system according to the present invention, Figure 2 is a polar graph of a typical directive pattern of a search radar antenna, Figure 3 shows the display which should be produced by search radar in response to aircraft at the same bearing but at various distances, Figure 4 shows the type of display which may be produced by a search radar set in response to aircraft carrying transponder beacons, Figure 5 illustrates details of a receiver including one type of control circuit for passing only main lobe radar pulses, Figure 6 illustrates a receiver including an alternate type of control circuit, Figures 7, 7a, 7b, and 7c are groups of oscillographs; each group refers to a different space relationship between the beacon receiver and the directive antenna of the radar; and each oscillograph in a group illustrates a voltage occurring at a different point of the control circuit of Figure 5 within the same interval of time.

Similar reference characters are applied to similar elements throughout the drawings.

Referring to Figure 1, a ground-based search radar set 7 transmits from antenna assembly 8 a pulse modulated radio signal in a horizontally directed beam which is rotated slowly in azimuth to scan the surrounding territory. Aircraft and all other reflecting objects in the territory reflect some of the transmitted energy back to the radar. The reflections can be detected and indicated by a radar; however, it is desirable to distinguish between aircraft and other objects.

This is accomplished by providing on each craft with which the system is to be used, a transponder beacon 9 which is "triggered" by signals received from the radar station 7, 8 to send out reply signals on a frequency different from that of the radar system. To this end, as is shown in Figure 1, the beacon comprises a receiver 10 which receives the radar pulses and a transmitter 11 which is triggered by the pulses after they have been detected in the receiver. The responsive signals are received at the radar system, for example, on appropriate elements of antenna assembly 8, and act to produce a display which shows only the aircraft equipped with transponders. According to the present invention, the ground-based radar also transmits control pulses but in this case from an antenna 12 which is omnidirectional horizontally.

It is the principle of the present invention to transmit from the radar, in the time channel of its trigger pulses or in one or more time channels synchronous therewith, control pulses having a signal strength which is related in a first sense to that of the main lobe trigger pulses, i. e., significantly less signal strength that the main lobe trigger pulses, and which are related in an opposite sense to trigger pulses undesirably radiated from side lobes of antenna 8, i. e., significantly more signal strength than any secondary lobe trigger pulses. Receiver 10 includes a signal separation and control circuit 13 which comprises elements for producing in the same time channel but in separate branches of the circuit a control pulse and a trigger pulse, for comparing the amplitudes of said pulses, and for utilizing the comparison to permit a trigger pulse to appear at the output of the receiver only if the relative strengths are the result of the trigger pulse being a main lobe pulse.

It is essential that the control and trigger pulses will not become inseparably intermingled in the circuits of the receiver. To this end, in one embodiment of the invention these different pulses are transmitted on different carrier frequencies. Because of the separation thus afforded they may be produced in the same time channel. On the other hand, in another embodiment, they are transmitted in different synchronous time channels and therefore they may use the same carrier frequency.

Figure 5 illustrates an embodiment of the invention in which the control and trigger pulses are transmitted on different carrier frequencies. If desired, these pulses may be intercepted at the beacon by separate antennas and they may thereafter be selected and amplified in entirely separate R. F. and I. F. channels prior to detection. In fact, this will be necessary if the carrier frequencies are very far apart. However, in the example shown herein, the carriers are only far enough apart so that the control and trigger transmissions may readily be separated in the receiver. Otherwise, they are near enough so that they may both be intercepted on a common antenna and both processed in common radio frequency, mixer, and intermediate frequency circuits, 14, 14a and 14b respectively, as shown in Figures 5 and 6. I have determined that for radar operating frequencies in the region of over two thousand megacycles the two-carrier frequencies preferably should be about 10 megacycles apart.

From the output of the intermediate frequency amplifier 14b of Figure 5 both signal pulses are applied to a common grid impedance network 15 for amplifier tubes 16 and 17. Network 15 may be an anti-resonant circuit appropriately loaded for broad-banding and tuned to the I. F. frequency. Double-tuned pass-band circuits 18 and 19 or any other appropriate conventional pass-band circuits are respectively included in the anode circuits of the amplifier tubes 16 and 17. They are respectively tuned to pass both the carriers and the sidebands of the respective trigger pulses and control pulses. Each of these circuits should be designed in accordance with known practices to have about a 30-decibel rejection to the significant components of the signal which is passed by the other. Except for the different tuning and bandwidth of their output circuits, tubes 16 and 17 correspond substantially to conventional intermediate frequency amplifier stages. Conventional portions of the circuits, such as cathode heaters, and screen and suppressor grid circuits, are not shown. Pass band circuits 18 and 19 feed individual diode detector circuits 20, 21 and 22, 23. Positive-going video trigger and control pulses will be produced across detector load resistors 21 and 23, respectively.

The remainder of the signal separation and control circuit 13 of Figure 5 comprises an arrangement for comparing these video pulses so that a receiver output pulse will be produced only when the ratio of the amplitude of the video trigger pulse to that of the video control pulse exceeds a predetermined value because the trigger pulse was a strong one received from the main lobe. Accordingly, the detected trigger pulse is applied to a first separator control tube (24) whose output is derived from the cathode load resistor and is still a positive-going pulse, whereas, the detected control pulse is applied to a second separator control tube (25) whose output is derived from its anode circuit and is inverted in polarity. The opposite-going output pulses of separator tubes 24 and 25 are applied to a common load circuit 26. If the pulse from tube 24 exceeds that from tube 25, current will pass through a unidirectional device 27 which may be a dry rectifier or crystal or, if desired, a vacuum tube diode. On the other hand, if the pulses from tube 25 are the larger, the additive pulse will be negative-going and will not pass through the unidirectional device 27. If the gain of the trigger-pulse and control-pulse channels of circuit 13 are equal, then it will be appropriate for the strength of the omnidirectional pulses sent from antenna 12 of the radar to be somewhat greater than that of the strongest side lobe trigger signals, but considerably less than that of main lobe trigger signals. However, it may be advantageous to achieve an equivalent result at the output of the separator control tubes 24 and 25 by adjusting the trigger pulse and control pulse channels to have unequal gains, for example, using greater gain in the latter channel will permit a lower level of useful signal strength from the omnidirectional antenna.

In the embodiment of Figure 6, the control pulses are sent on the same carrier frequency as the radar pulses but in adjacent time channels. I have found that if only one control pulse is employed for each trigger pulse, then, should it be received alone at the beacon, the separation and control circuit 13 shown in Figure 6 may produce a spurious output signal which cannot be distinguished from a trigger pulse. For example, in the rotation of antenna system 8, there are intervals during which a null in the horizontal radiation pattern will point toward the receiving antenna of beacon 9. At such a time no radar pulse will be received. During the same interval, however, control pulses from omnidirectional antenna 12 may be reaching the beacon. According to the operation of circuit 13 of Figure 6, if these are single pulses occurring at the radar repetition frequency they will have the same effect as main lobe radar pulses received alone, i. e., for example, received by a beacon at such a great range that the omnidirectional control pulses do not reach it. In other words, they will be the full equivalent of trigger pulses received without control pulses. Accordingly, in this embodiment of the invention, it is preferable to employ at least two control pulses for each trigger pulse. Circuit 13 of Figure 6 is so arranged if it receives a train of two or more pulses of equal amplitudes in which the adjacent pulses are separated by a predetermined interval equal to the delay of an element of the circuit, no output pulse will be produced (see Figure 7c). Thus, when a null is pointed at the beacon, the control pulses, if they number two or more, will act effectively to eliminate one another. If a trigger pulse follows or precedes the plurality of control pulses by an interval equal to the interval between the control pulses, then the circuit will produce an output pulse only if the trigger pulse exceeds the common amplitude of the control pulses, a condition fulfilled when it is received from the main lobe.

For a system using a receiver of the kind shown in Figure 6, the radar in overall effect transmits a composite signal which comprises the train of groups of pulses in which each group includes a trigger pulse whose signal strength may be very great or very small, depending on the position of antenna 8, and two or more control pulses of an intermediate signal strength. All of the pulses in each group are separated by the same interval which preferably is much smaller than the period of the repetition frequency of the radar, and the groups are produced at the repetition rate of the radar. The composite signal passed through the radio frequency components 14, the mixer 14a, the intermediate frequency amplifier 14b, the detector 14c, and the video amplifier 14d all in a well-known manner. The output of the video amplifier 14d is applied in circuit 13 of Figure 6 to a common grid impedance 28 from which it is applied to two cathode follower tubes 29 and 30. A delay circuit 31, such as a real or artificial transmission line, which has a delay equal to the interval between the control pulses, is connected in series with the output of the first cathode follower 29.

In the example shown herein the control pulses precede the trigger pulses. For this reason, they are referred to as previous pulses, while the interval between them will be herein designated as $tau_{pp}$. From circuit 31 the delayed composite signal is applied to one of two input circuits of a differential amplifier 32 which comprises two vacuum tubes 33 and 34 having a common cathode return through a resistor 35. Resistor 35 has a large enough value to insure that the total current through the two tubes 33 and 34 remains nearly constant. As is well known, a balanced differential amplifier produces at its two anode circuits two push-pull voltages, each of which is proportional to the input to one of the tubes subtracted from that to the other. As a result, and because of the phase shift produced by circuit 31, all but one of the input control pulses reach each input circuit, i. e., one input control pulse, if the total number thereof is only two, will be effectively cancelled, each one being cancelled by having a pulse of equivalent magnitude subtracted from it, and will not appear in either of the push-pull outputs. Under these conditions, whenever a null of antenna 8 points at the beacon (and assuming that the transmitted control pulses number two), each push-pull output of the differential amplifier will comprise two oppositely going control pulses separated by $2 \cdot tau_{pp}$, this being illustrated by waveforms C and D of Figure 7c. One of the push-pull outputs is delayed by a second delay circuit 36 which is similar to the first delay circuit 31. Since the delay is only $tau_{pp}$, whereas the interval between the output pulses of amplifier is $2 \cdot tau_{pp}$, there will be no coincidence between any of the pulses in the output of tube 34 with any in the delayed ouput of tube 33 (see waveforms E and D of Figure 7c).

Circuit 13 of Figure 6 next includes a coincidence circuit 37, 38, 39 having two inputs fed respectively from the output of the second delay circuit 36 and the output of tube 34. This coincidence circuit will only produce an output pulse when it simultaneously receives two positive pulses. Accordingly, in the absence of a trigger pulse, no coincidence will be achieved and there will be no output. When there is a trigger pulse in the composite signal it will ordinarily be either larger, if a main lobe pulse; or smaller, if a secondary lobe pulse; than the other pulses in each group. Where the trigger pulses are larger, their complete cancellation will not occur due to the action of the differential amplifier. Instead, the push-pull outputs respectively will include that large trigger pulse less the second previous pulse (which was delayed to its time channel in circuit 31) and that large trigger pulse subtracted from that second previous pulse (neglecting the gain of the amplifier on phase inversions). The trigger pulse which was delayed in circuit 31 will appear in each of the push-pull outputs being therein $tau_{pp}$ later than the difference pulse for that output and opposite to it in phase. (See wave forms C and D in Figure 7a.) Because of this, the delayed output from circuit 36 and the undelayed output of tube 34 will include coincident positive-going pulses which will actuate the coincidence circuits 37, 38, 39. It is possible to control whether the two coincident pulses will be positive or negative by choosing whether the second delay circuit 36 is placed in the output circuit of tube 33 or tube 34.

Where the trigger pulse is due to a secondary lobe (see wave forms C or D of Figure 7b), the pulses which are in coincidence are negative-going. It will be seen that for this reason they will be eliminated by clipping. But even if they were not, they would be incapable of actuating the coincidence circuit 37, 38, 39. This operation will be assured so long as the input pulses to circuit 13 are positive and the second delay circuit 36 is located as shown.

The coincidence circuit 37, 38, 39 comprises a coincidence control tube 37 having a sharp cut-off control and suppressor grids which may be biased just below cut-off over grid resistors 38 and 39. In the example shown, a cathode biasing network is also shown. This will not be necessary if the grid biases are sufficiently large and of course where it is used those biases may be appropriately reduced. In series with the suppressor and control grid input circuits from the outputs of delay circuit 36 and tube 34 respectively, there are included circuits for clipping any negative-going pulses. Each of these includes a series unidirection device, 40 and 41 respectively, such as a dry rectifier, a crystal, or a vacuum tubed iode and a shunt resistor, 42 and 43 respectively. If each of the unidirectional devices has, by comparison with its associated shunt resistor, a very high impedance for negative voltages applied on its input side, the principal part of any negative-going signal will be lost as a voltage drop across it and will not be communicated to tube 37. On the other hand, if its corresponding impedance to positive voltages is substantially lower than the value of its associated shunt resistor, all positive-going pulses will be applied to the control tube 37 with but small reduction in magnitude. Due to the cutoff biasing of the grids of tube 37, the negative pulse clippers are not essential to successful operation of the circuit.

If tubes 33 and 34 of the differential amplifier are triodes as shown herein, their load resistances should be small enough to minimize Miller effect in order to preserve the shape of the pulses. If gain is required, larger load resistors may be employed by replacing the triodes with pentodes, as is well known. Since the differential amplifier is a symmetrical circuit, its two tubes should be a matched pair and their load resistors should be of equal value.

Figures 7, 7a, 7b, and 7c illustrate in detail voltages which appear at points, A, a, b, c, d, e, f, g, h of circuit 13 of Figure 6. It is seen from these wave forms that where the beacon is far enough away from the radar to receive only main lobe radar pulses, the separator and control circuit 13 does not act to prevent the passage of the radar pulse through to the output of the receiver; that where the beacon is near enough to receive control pulses along with main lobe radar pulses, the control pulses are ineffectual to prevent the main lobe pulses from passing through the receiver; that where the beacon is near enough to the radar to receive secondary lobe energy the control pulses will be effective to prevent secondary lobe radar pulses from passing through the receiver; and where the beacon is near enough to receive control pulses by themselves at times when it receives no radar pulses because a null of the radar antenna is pointing toward it, some of the control pulses will cause the cancellation of others and no control pulses will pass through the receiver to its output.

It will be noted from Figures 7 and 7a that in cases where there is an effective output from the receiver, a separation and control circuit 13 of the type used in the Figure 6 embodiment causes the trigger pulse to be delayed by $tau_{pp}$ from the radar trigger pulse time channel. This, of course, if not compensated for, would have an effect upon the range accuracy of the system. However, this can be readily corrected in any of a number of ways, which will be readily apparent to those skilled in the art. For example, each output pulse of the receiver may be delayed before triggering the transmitter by a period of time equal to the interval between radar trigger pulses less $tau_{pp}$, or the ground station may be arranged to include means for delaying the start of each P. P. I. indicator sweep by an interval of $tau_{pp}$ after each transmitted radar pulse.

I claim as my invention:

1. In a radio receiver for receiving signal pulses transmitted from a directive antenna and control pulses transmitted synchronously with said signal pulses from an omnidirectional antenna, comparison means for receiving the signal pulses and the control pulses for directly comparing the amplitudes of the signal and control pulses, and means including said comparison means for rejecting all pulses when the amplitude of the signal pulses is less than that of the control pulses, and for producing an output signal when the amplitude of the signal pulses is greater than that of the control pulses, all amplitudes being taken at the time of comparison of the pulses.

2. In a radar system including a ground based radar set transmitting signal pulses from a directive antenna and synchronously therewith control pulses from an antenna which is omnidirectional in a plane in which said first-mentioned antenna is directive, the control pulses being transmitted with a signal strength related in a first sense to that of the main lobe signal pulses and in the opposite sense to that of the largest secondary lobe signal pulses, a mobile station including a receiver for receiving signal pulses and control pulses and for producing at its output only signal pulses from the main lobe of the directive radar antenna, the receiver comprising means for directly comparing the amplitude of a control pulse with that of a signal pulse to effectively reject the latter when the amplitude of the former at the receiver input is related to that of the latter in said opposite sense and to produce an output pulse only when the amplitude of the former at the receiver input is related to that of the latter in said first sense.

3. In a radar system including a search radar set transmitting pulse signals from a directive antenna and synchronously therewith control pulses from an antenna omnidirectional in a plane in which said first mentioned antenna is directive, the control signals comprising groups of at least two pulses for each signal pulse, one control pulse of the group being separated from said signal pulse and the adjacent control pulses of the group being separated from each other by an interval $tau_{pp}$ which is very much smaller than the period between the signal pulses, at least one mobile station including a receiver comprising first and second branch circuits, means for transferring all of the received signal pulses and control pulses to the first branch circuit without appreciable delay and to the second branch circuit after a delay equal to $tau_{pp}$, subtracting circuit means for receiving on two respective inputs the pulse signals from said two branch circuits to produce two push-pull voltages respectively proportional to the signals from a respective one of the branch circuits subtracted from those from the other, a coincidence circuit responsive to two coincident pulses of a given polarity to produce an output pulse, and means for delaying one of the push-pull voltages with respect to the other by an interval equal to $tau_{pp}$ and for thereafter respectively applying it and the other push-pull voltage to the coincidence circuit.

4. A control circuit for receiving trains of groups of pulses to selectively produce only predetermined ones of the pulses at its output in which adjacent pulses in each group are separated from each other by an interval $tau_{pp}$ which is much smaller than the period between the groups, comprising a common input circuit for the groups of pulses, first and second branch circuits, means for transferring the groups of pulses to the first branch circuit without appreciable delay and to the other with a delay of $tau_{pp}$, subtracting circuit means for receiving on two respective inputs the groups of pulses from the two branch circuits and to produce two push-pull voltages respectively proportional to the pulses from a respective one of the branch circuits subtracted from those from the other, a coincidence circuit responsive only to two coincident pulses of a given polarity to produce one output pulse, and means for delaying one of the push-pull voltages with respect to the other by an interval equal to $tau_{pp}$ and for thereafter respectively applying it and the other push-pull voltage to the coincidence circuit.

5. A radio navigation system including at a ground station directional radio transmitter means providing a radiation beam, said beam including a principal or main lobe and undesired side lobes, means rotating said beam in azimuth, and means pulse modulating said transmitter, further transmitter means at said ground station radiating with substantially uniform intensity in all azimuthal directions which are swept by said beam, and means pulse modulating said further transmitter for causing the latter to transmit two spaced pulses for each pulse transmitted by the first-named transmitter but in advance thereof by a predetermined interval; at least one mobile station including receiver means responsive to both radiations from said ground station to produce signals representing the modulations thereof, and means responsive to both said signals to effectively block all of them from reaching the output of the receiver when the amplitude of the signal received from said directional transmitter bears a ratio to the amplitude of the signal received from said further transmitter which is less than the ratio of the intensity of said side lobes to the intensity of said azimuthally uniform radiation and at all other times permitting those representing the modulations of the radiations of said first transmitter to reach said output.

6. In a radio receiver for receiving signal pulses transmitted in a first channel from a directive antenna and control pulses transmitted synchronously in a different channel from a point near said antenna and omnidirectionally in a plane in which said antenna is directive and for producing at its output only signal pulses from the main lobe of the directive antenna, the control pulses being transmitted with a signal strength related in a first sense to that of the main lobe signal pulses and in the opposite sense to that of the largest secondary lobe signal pulses, comprising means for receiving the signals in their separate channels to produce them in a common channel, means for comparing in the common channel a control pulse with a signal pulse to effectively reject the latter when the amplitude of the former at the receiver input is related to that of the latter in said opposite sense and to produce an output pulse, which represents said latter pulse and corresponds to it in duration, when instead the amplitude of said control pulse at said input is related to that of said signal pulse in said first sense, said last-mentioned means comprising means for comparing the amplitudes of respective signals derived by demodulation of a signal pulse and a control pulse and means for preventing a signal deriving from a control pulse from appearing at the receiver output.

7. A transponder for receiving control pulses and directionally radiated signal pulses, the directional radiation of said signal pulses including a main lobe and side lobes, comprising first amplifier means to which the control pulses are applied; second amplifier means to which the signal pulses are applied, the relative gains of said two amplifier means being such that the output pulses of the first are of greater amplitude than those of the second when the signal pulses are received in said main lobe, and of smaller amplitude than those of the second when the signal pulses are received in said side lobes; and comparison means connected to receive the output pulses of said two amplifier means for producing an output signal solely when the pulses received from the second amplifier means are of greater amplitude than those received from the first amplifier means.

8. A transponder for receiving control pulses and directionally radiated signal pulses, the directional radiation of said signal pulses including a main lobe and side lobes, comprising first amplifier means to which the control pulses are applied; second amplifier means to which the signal pulses are applied, the relative gains of said two amplifier means being such that the output pulses of the first are of greater amplitude than those of the second when the signal pulses are received in said main lobe, and of smaller amplitude than those of the second when the signal pulses are received in said side lobes; and comparison means connected to receive the output pulses of said two amplifier means for producing an output signal solely when the pulses received from the second amplifier means are of greater amplitude than those received from the first amplifier means, said comparison means including an impedance network, the pulses from said first amplifier means being applied in one sense to said network and those from the second amplifier means being applied in an opposite sense to said network.

9. A transponder for receiving omnidirectional radiated control pulses and simultaneously directionally radiated signal pulses, the directional radiation of said signal pulses including a main lobe and side lobes, comprising a first amplification channel to which the control pulses are applied; a second amplification channel to which the signal pulses are applied, the relative gains of said channels being such that the output pulses of the first are of greater amplitude than those of the second when the signal pulses are received in the main lobe of the directional radiation, and of smaller amplitude than those of the second when the signal pulses are received in side lobes of the directional radiation; and a signal amplitude comparison circuit connected to receive the output pulses of said two channels for producing an output signal solely when the pulses received from the second channel are of greater amplitude than those received from the first channel.

10. A transponder for receiving omnidirectional radiated control pulses and simultaneously directionally radiated signal pulses, the directional radiation of said signal pulses including a main lobe and side lobes, comprising a first amplification channel to which the control pulses are applied; a second amplification channel to which the signal pulses are applied, the relative gains of said channels being such that the output pulses of the first are of greater amplitude than those of the second when the signal pulses are received in the main lobe of the directional radiation, and of smaller amplitude than those of the second when the signal pulses are received in side lobes of the directional radiation; and a signal amplitude comparison circuit connected to receive the output pulses of said two channels for producing an output signal solely when the pulses received from the second channel are of greater amplitude than those received from the first channel, said signal comparison circuit including a resistor, the pulses from the first channel being applied in the one sense to one end of the resistor and the pulses from the second channel being applied in an opposite sense to another end of the resistor, and a diode connected to a center tap on said resistor for producing an output signal solely when the pulses from said second channel are of greater amplitude than those from said first channel.

References Cited in the file of this patent

UNITED STATES PATENTS

| | | |
|---|---|---|
| 2,134,716 | Gunn | Nov. 1, 1938 |
| 2,279,031 | Cockerell et al. | Apr. 7, 1942 |
| 2,419,525 | Alford | Apr. 29, 1947 |
| 2,421,017 | Deloraine | May 27, 1947 |
| 2,457,396 | Pollard | Dec. 28, 1948 |
| 2,468,045 | Deloraine | Apr. 26, 1949 |
| 2,480,068 | Wolff | Aug. 23, 1949 |
| 2,480,123 | Deloraine | Aug. 30, 1949 |
| 2,495,766 | Reade | Jan. 31, 1950 |
| 2,502,317 | Ewing | Mar. 28, 1950 |
| 2,505,017 | Wagner | Apr. 25, 1950 |
| 2,513,282 | Busignies | July 4, 1950 |
| 2,514,351 | Smith | July 4, 1950 |
| 2,606,282 | Lipkin | Aug. 5, 1952 |